United States Patent [19]
Keim et al.

[11] Patent Number: 5,160,520
[45] Date of Patent: Nov. 3, 1992

[54] PROCESS FOR THE PRODUCTION OF A BLANK MOLD FOR GLASS FIBER OPTICAL WAVEGUIDES

[75] Inventors: Norbert Keim, Bietigheim-Bissingen; Manfred Wittmann, Stuttgart, both of Fed. Rep. of Germany

[73] Assignee: Kabelmetal Electro GmbH, Fed. Rep. of Germany

[21] Appl. No.: 718,626

[22] Filed: Jun. 21, 1991

[30] Foreign Application Priority Data

Jun. 23, 1990 [DE] Fed. Rep. of Germany ....... 4020101

[51] Int. Cl.$^5$ .......................................... C03B 37/025
[52] U.S. Cl. .............................................. 65/2; 65/13; 65/109; 65/110; 65/120; 65/244
[58] Field of Search .................. 65/2, 12, 13, 102, 109, 65/292, 271, 356, 244, 110, 120, 3.12; 239/132.3, 239, 552

[56] References Cited

U.S. PATENT DOCUMENTS

| | | | |
|---|---|---|---|
| 3,876,149 | 4/1975 | Futerko | 239/552 |
| 4,231,777 | 11/1980 | Lynch et al. | 65/271 |
| 4,401,267 | 8/1983 | Spainhour | 239/132.3 |
| 4,477,244 | 10/1984 | Nis et al. | 239/552 |
| 4,645,451 | 2/1987 | Schneider et al. | 65/271 |

Primary Examiner—Robert L. Lindsay
Attorney, Agent, or Firm—Ware, Fressola, Van Der Sluys & Adolphson

[57] ABSTRACT

To produce a blank mold for glass fiber optical waveguides with a core and a single or multilayer sheath, in which the core glass material is applied to the inner wall of a glass tube by chemical deposition from the vapor phase, the internally-coated glass tube is caused to collapse by temperature treatment, and this blank mold is finally drawn out into a glass fiber, the temperature treatment for collapse is carried out along the glass tube in accordance with a temperature profile that is determined by an upper region of maximum glass temperature along the treated section of glass tube (hot zone) and a lower region at the glass softening temperature (soft zone). The region of maximum glass temperature shows a largely uniform temperature level with a width along the section of glass tube that is approximately equal to the width of the region at the glass softening temperature.

11 Claims, 4 Drawing Sheets

PROCESS FOR THE PRODUCTION OF A BLANK MOLD FOR GLASS FIBER OPTICAL WAVEGUIDES

BACKGROUND OF THE INVENTION

1. Field of the Invention

The present invention relates to a process and apparatus for the production of a blank mold for glass fiber optical waveguides.

2. Description of the Prior Art

It has become standard to use blank molds in the manufacture of glass fiber optical waveguides. These molds have a core and a sheath, in which the core glass material is applied to the inner wall of a glass tube by chemical deposition from the vapor phase, the internally-coated glass tube is caused to collapse by temperature treatment, and this blank mold is finally drawn out to a glass fiber.

Internal coating processes of this type, also known as modified chemical vapor deposition (MCVD) processes have been customary for a long time. In these processes, a suitable heat source used in the coating or collapsing system is moved one or more times along the glass tube in a longitudinal direction, with the corresponding temperature treatment being carried out in only one direction as a rule. For coating, metal halides, e.g., pure or doped silicon halides, are converted at high temperatures to the corresponding oxides, with the chemical conversion and the deposition process occurring practically simultaneously.

The need for increasing the manufacturing speed in glass fiber manufacture and the resulting increased output have already been the reason for increasing the burner capacity to arrive at shorter collapse times. Because, according to the formula:

$$v(r) = \frac{p_a - p_i + * \left(\frac{1}{r_a} + \frac{1}{r_i}\right)}{2 * * \left(\frac{1}{r_a^2} - \frac{1}{r_i^2}\right)} * \frac{1}{r}$$

where $v(r)$ is the collapse rate,
$p_a$ is the pressure on the outer surface,
$p_i$ is the pressure on the inner surface, is the surface tension,
$r_a$ is the external radius
$r_i$ is the internal radius, and is the melt viscosity (temperature in 3C), the quartz glass runs together faster with increasing softening. Nevertheless, an increased output cannot be achieved in practice, because the product quality obtained leaves something to be desired. This is because an increase in the burner capacity, with the burner settings customary at the present time, leads to the fact that the tubes that are to be collapsed are warped, distorted, or twisted, and can therefore no longer be held in a stable manner in the rotation axis during the manufacturing process. The collapse process must be discontinued without having the possibility of exhausting the actual potential of the burner.

SUMMARY

The invention is based on the task of finding a possibility for reducing the collapse time, without jeopardizing the product quality.

According to the invention, this problem is solved by carrying out the temperature treatment for the collapse along the glass tube in accordance with a temperature profile that is determined by an upper region of maximum glass temperature along the treated section of glass tube (hot zone) and a region at the glass softening temperature (soft zone), with the region of maximum glass temperature presenting a largely uniform temperature profile with a width along the section of glass tube that is approximately equal to the width of the glass softening temperature region.

Deviating from the state of the art, the invention for the first time establishes a specific temperature distribution for the collapse. This is because the invention is based on the finding that, for the collapse process, one must consider the complete temperature profile above the glass softening point and that it is not possible to confine oneself only, as has been done up to now, to a measurement of a point of the hot zone (kinetic criterion) for evaluating the temperature distribution.

In this case, it is important that the upper 100° C. of the temperature profile determine the collapse rate (kinetics). In the axial direction, the factor responsible for the mechanical stability is the width of the soft zone directly above the softening temperature of the quartz glass of approximately 1800° C. (stability criterion). For a stable collapse process, the expansion of the soft zone, which is dependent on the particular outside diameter and wall structure of the quartz glass tube, must not exceed a maximum value, also referred to as the stability width. A temperature profile adjusted according to the invention leads to high collapse rates and, thus, to high manufacturing rates. Distortions and warps of the blank mold in the hot zone are not to be expected, because of the avoidance of jagged variations in the temperature profile.

The ratio between the width of the region of maximum glass temperature and the width of the region of glass softening temperature, in the execution of the invention, has a value of 1:4 to 1:1, preferably 1:2 to 1:1. For the temperature course in the region of the section of the glass tube provided by the burner for the purpose of collapse, this leads to a broadening of the temperature profile peak, with high local temperature gradients on the sides, so that high manufacturing speeds can be achieved. The ideal temperature distribution during the collapse is thus represented by a rectangular profile, in which the width of the hot zone (kinetics) is extended to the width of the soft zone (stability width) (1:1).

As has already been customary for a long time, the deposition of layers deposited from the gas phase on the inner surface of the glass tube and the collapse of the coated tube are carried out by a temperature treatment by means of gas burners or other heat sources, such as electric or plasma furnaces, conducted along the tube. In order to achieve the temperature profile proposed according to the invention in the best possible manner in the burners available on the market, the flow pattern is controlled in a specific manner.

In this case, the increase and broadening of the temperature profile peak that is decisive for the kinetics can be carried out by specific mechanical, and, therefore, flow-wise optimization of the burner according to the invention, with a maintenance of the stability width. However, a further utilization of the potential is obtained only if, at the full burner capacity, the marginal regions of the flow course are covered by the control.

This control can be carried out, for example, by deflecting the burner gases from the surface of the glass tube, so that they are not available for heating in the particular section of the tube. For this purpose, it is possible to use, for example, a supplementary gas stream, which can also contain a protective gas, and which is conducted against the blank mold, for example, tangentially, by one or more supplementary jets located on one or both sides of the burner. Another possibility is to ensure the deflection of the burner gases from the surface of the glass tube by exhaustion of the flow in the marginal region. For this purpose, one or more suction devices, located on one or both sides of the burner, which can also be equipped in a very simple manner as suction plates, have proved advantageous.

Independently of the special measures, other equipment or processes are, of course, also possible, which make it possible to affect the temperature profile in such a way that high local temperature gradients in the edge regions lead to an approximately rectangular temperature profile.

DESCRIPTION OF THE DRAWINGS

FIGS. 6a-6c and 7a-7c show schematically possible embodiments of burners constructed in accordance with the present invention.

DETAILED DESCRIPTION OF THE PREFERRED EMBODIMENT

The invention will now be explained in greater detail with reference to the collapse process shown as an example of embodiment in FIGS. 1 through 6.

Figure 1:
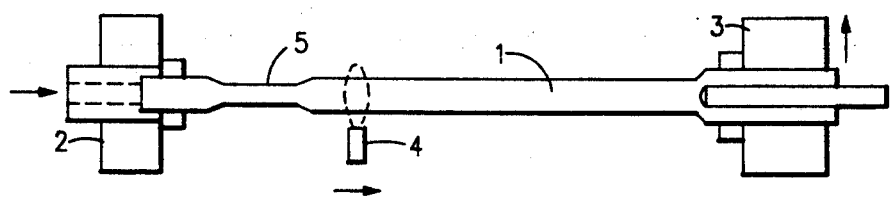
FIG. 1 is a schematic illustration of a collapsing apparatus.

FIG. 1 shows, in schematic representation, the course of a collapse process in which the internally coated quartz glass tube 1 is clamped on both sides in the jaw chucks 2 and 3. The tube 1 is supported rotatably within the jaw chucks and rotates while the burner 4, which serves as a heat source in this case, is moved forward and backward in the direction of the arrow in order to ensure the collapse of the tube 1, i.e., the shrinkage into the final blank mold 5. The so-called process gases, i.e., the chemicals required for the reaction process, are introduced on the side of the jaw chuck 2 into the quartz glass tube 1, and the residual gases remaining after the reaction are led out of the tube 1 at the other end of the tube, at the jaw chuck 3. This situation is shown by the arrows at the respective jaw chuck. As can also be seen from FIG. 1, the collapse of the glass tube 1 proceeds in sections. The temperature required for these purposes and produced by the burner 4 has the temperature profile of a commercially-available burner shown in FIG. 2.

This temperature profile results from the fact that the particular glass temperature has been determined along the section of the quartz glass tube 1 covered by the burner. As can be seen, the temperature profile contains a lower region 6 which, as a so-called soft zone, defines the region of the glass softening temperature, while an upper region 7, as a so-called hot zone, illustrates the maximum glass temperature produced by the burner or another heat source. As this figure also shows, the width of the lower region 6 is a multiple of the region 7 responsible for the actual collapse process.

Figure 2:
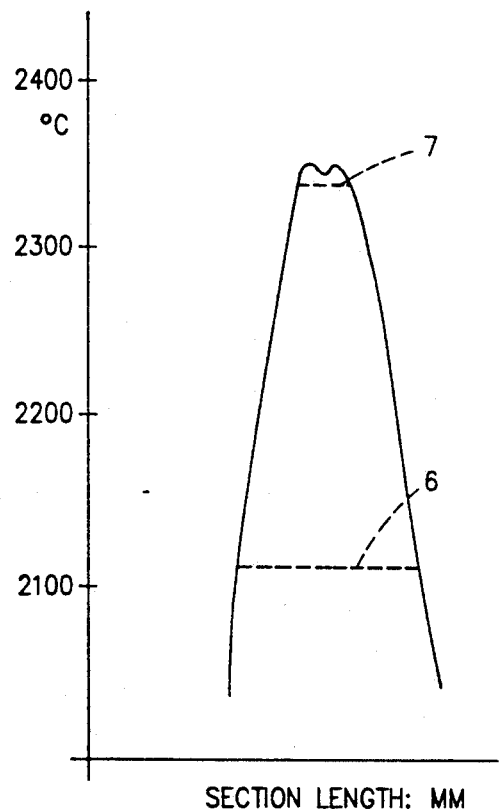
FIG. 2 shows the temperature profile of a commercially available burner.

As already stated, in the known case, shown in FIG. 2, an increase in the burner capacity does not lead to an improvement of the collapse process, and even less to an improvement in the product quality, because the width of the soft zone 6 increases with the increase in capacity, and the stability of the quartz glass tube 1 is thus jeopardized. An exceeding of the stability width manifests itself by a warping or distortion of the quartz glass tube clamped between the jaw chucks 2 and 3.

Figure 3:
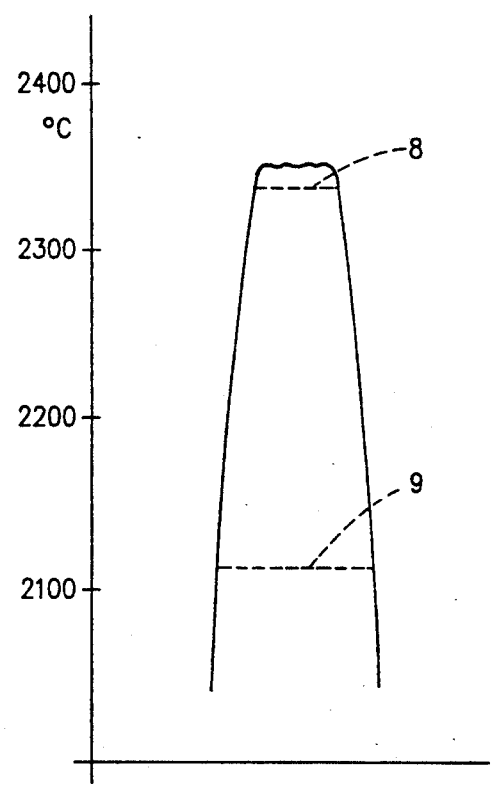
FIG. 3 shows the temperature profile of a burner designed in accordance with the present invention.

Relief is provided in this case by a temperature profile used according to the invention which, in turn, results from the fact that the glass temperature is plotted above the section length of the particular tube section covered by the burner or another heat source. FIG. 3 shows how a broadening of the hot zone 8 in a burner developed according to the invention can be achieved. It is important in this case that, with the broadening of this hot zone, which is determining for the actual collapse process, the lower soft zone 9 is broadened only insignificantly, if at all. In the execution of the collapse process, this approximation of the width of the hot zone 8 to the width of the soft zone 9 leads to high-grade products, with a significant increase in the manufacturing speed.

Figure 4:
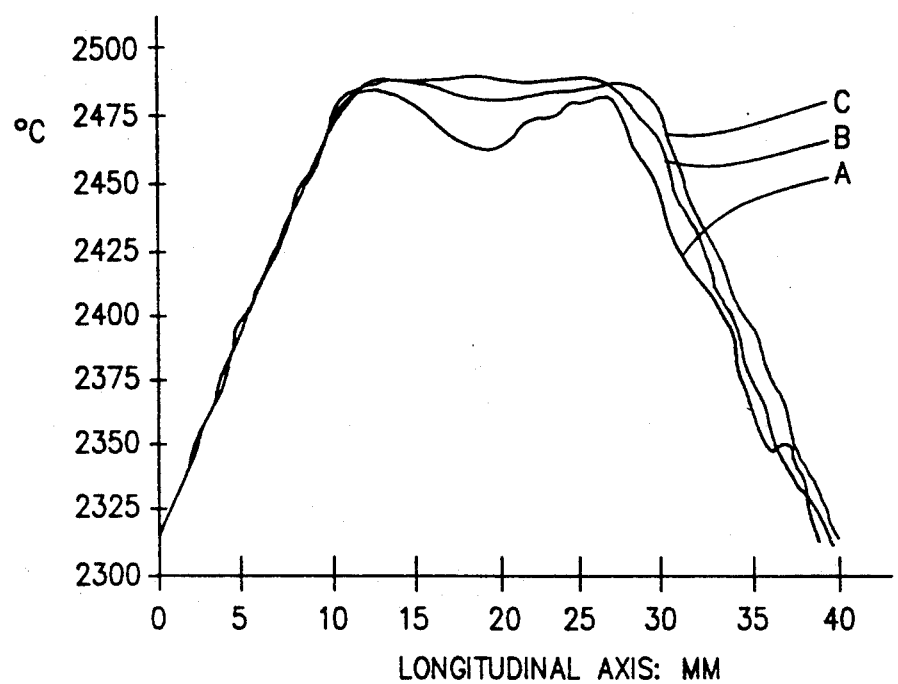
FIG. 4 shows an enlarged scale of hot zone temperature profiles.

As an example for the optimization of the central region of the peak of the temperature profile, reference is also made to FIG. 4, in which the temperature course in the region of the hot zone 8 is shown on an enlarged scale and for three different cases. While the curve pattern designated by A shows the course as described above, which does not permit an increase in the manufacturing capacity through an increase in the burner capacity, the gradual elevation and broadening of the hot zone corresponding to the curve patterns B and C, in which, in addition, the maximum glass temperature is held at as even a temperature level as possible, shows the possibility of producing an increase in capacity in the production of blank molds for glass fiber technology with a simultaneous improvement in the product quality, without an increase in the width of the soft zone. In the exemplifying embodiment shown, the establishment of the temperature profile C results in a decrease in the collapse time by 20 percent, as compared with A.

Figure 5:
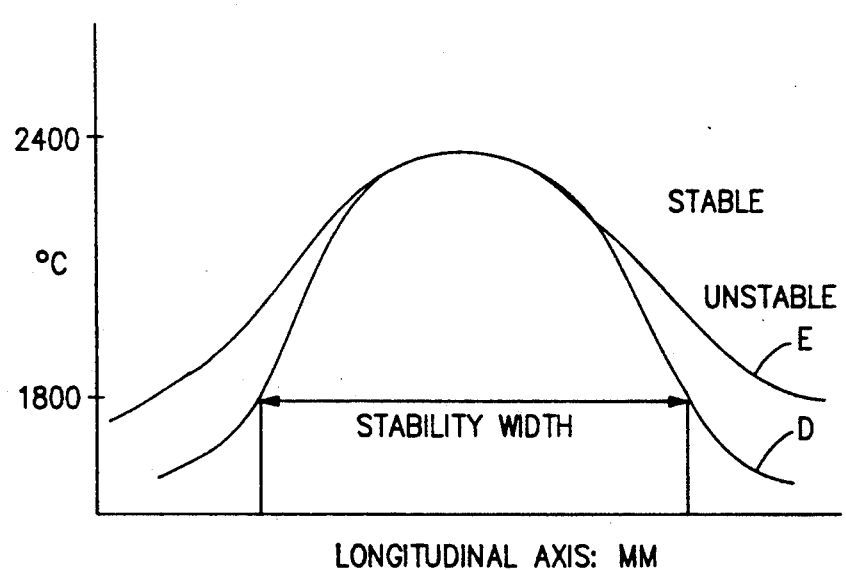
FIG. 5 shows additional temperature profiles.

FIG. 5 shows two other temperature profiles D and E, which make it clear that it is important for the invention to maintain the most uniform possible temperature level in the region of maximum glass temperature, but also that, on the other hand, a broadening of the hot zone in the direction of the blank mold axis must not automatically include a broadening of the soft zone in the same direction. The width of the soft zone, also designated as the stability width in FIG. 5, must not exceed specific values, based on the outside dimensions of the quartz glass tube intended for the blank mold, because there is otherwise a danger that the blank mold will pass into the unstable state and that the previously-mentioned mechanical problems, such as warping and distortion, will thus appear. An unstable state of this type would result in the case of the temperature profile according to E.

A very large variety of burner types is available as a heat source for the internal coating and collapse of glass tubes. Examples of suitable burners are the so-called half-shell ring burners, full-ring burners, with or without radial protective veils, and so-called free-jet burners, in which the oxygen emerges at high velocity from the individual jets of the burner heads. The burner heads, and also the jets, can, in each case, be rotatable, pivotable, and changeable in their distance from each other, but all burners, regardless of their particular design, must be firmly adjusted in their possibilities of adjustment for use in the coating and collapse of glass tubes for a production process. Although the mode of operation of these differently-constructed burners can, in principle, be optimized for the particular use by an adjustment of the spacing and of the alignment of the jets to the glass tube, unless the assessment of the temperature profile is known, an inadequate utilization of the burner technology will take place.

Starting from the state of the art, the invention provides for an assessment of the temperature profile in two zones. While the hot zone in the peak region of the temperature distribution is responsible for the kinetics of the collapse process, the width of the temperature profile in the region of the glass softening point is the decisive factor for the stability of the collapse process. This basic finding results, for the first time, in clear, quantitatively determinable, and reproducible design data for new burners (rectangular profile) and control measures for the burner system.

While FIG. 3 documents the successful conversion of the temperature profile design in the development of a new burner, FIG. 4 shows how, with a maintenance of the empirical stability width determined for the blank mold production process in question, it was possible to obtain the maximum collapse capacity of a standard burner, with the nozzle positioning and throughput conditions acting as the decisive optimization parameters in this case.

The achievement of higher temperature gradients in the side region by means of appropriate design measures is shown in the application examples of FIGS. 6a–6c and 7a–7c.

Figure 6A:
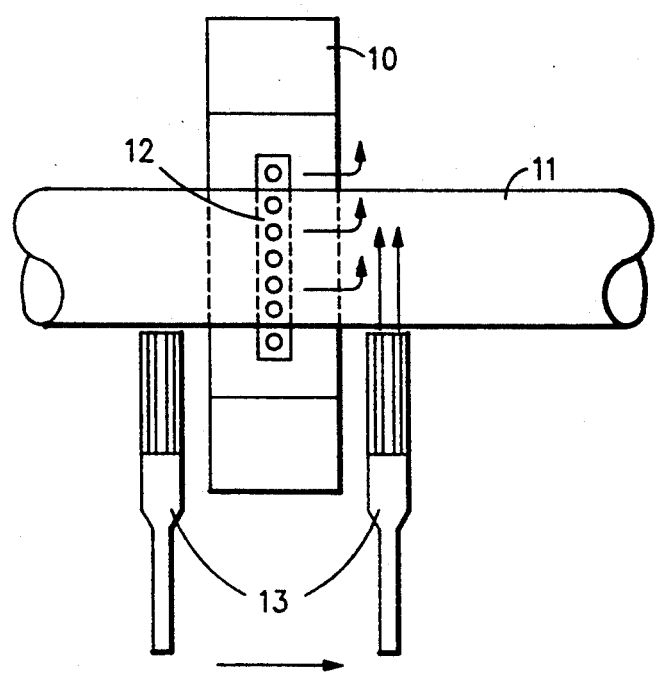
Figure 6B:
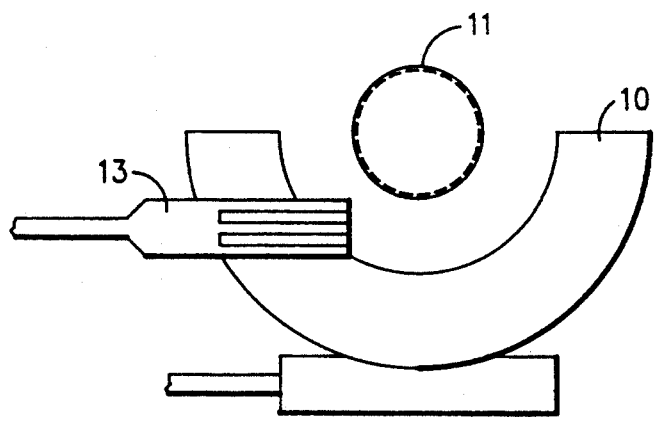

FIG. 6a shows in a top view and FIG. 6b in a side view the measure according to the invention in the case of a half-shell burner 10 which, during the collapse of the coated quartz glass tube 11, which is clamped firmly but rotatably at its end in accordance with the exemplifying embodiment according to FIG. 1, is moved in the direction of the arrow. The nozzle arrangement is designated by 12 and, as indicated by the arrows, the combustion gases emerge from these jets at high velocity. When the burner gases strike the surface of the quartz glass tube 11, they are deflected to a greater or lesser extent, particularly in the side regions, and thus lead to a temperature profile in the region of the tube section that is to be heated, with relatively flat temperature gradients, at least in the lower temperature range. Because this effect manifests itself in an even more serious manner when the collapse process is to be, for example, accelerated by an increase in the burner capacity, and there is thus a danger that the stability limit in the soft zone will be exceeded, the invention provides for auxiliary jets 13, also designated as tangential displacing units, which, for example, are supplied with a protective gas and, as a result of their blowing action, as shown in FIG. 6a, lead to a deflection of the gases emerging from the burner 12. This actually means that the flame flow, which emerges axially with respect to the tube 11, is displaced by the tangentially directed stream of auxiliary gas. In this way, it is made certain that the undesired heating of the tube 11 in the region under consideration is prevented with practically no repercussion on the flame center, and, in this way, a steep temperature gradient is produced, and the width of the hot zone can be correspondingly expanded.

Figure 7A:
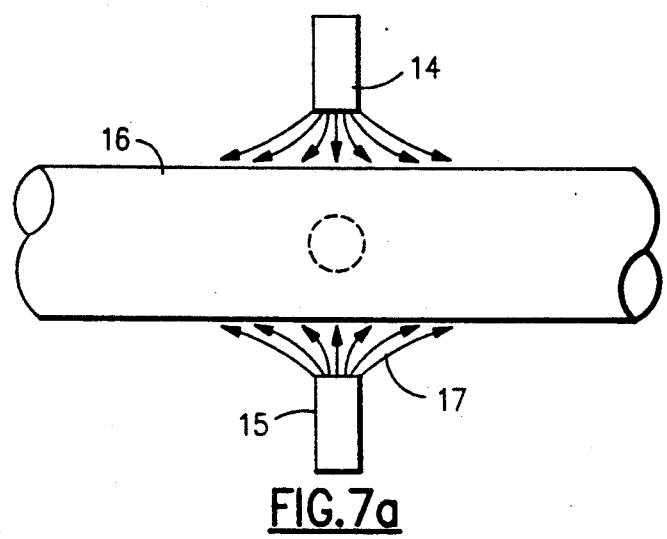
Figure 7B:
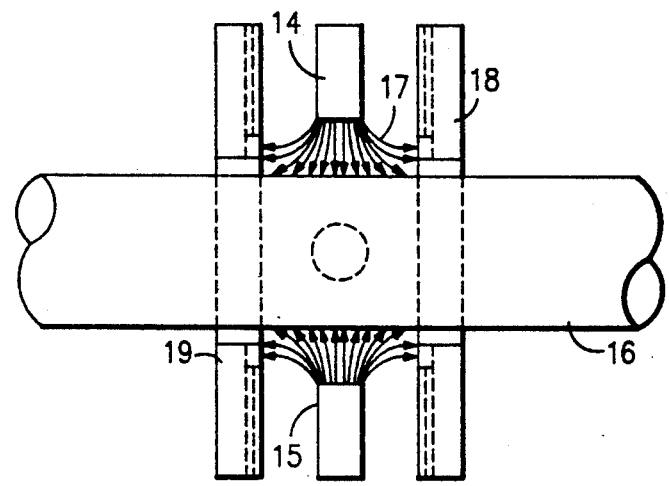
Figure 7C:
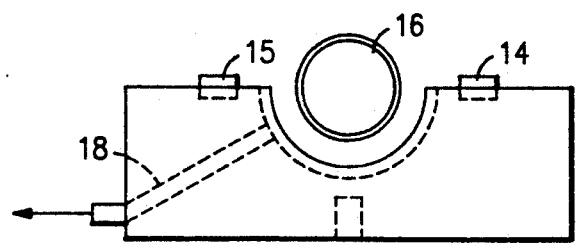

The arrangement shown in FIGS. 7a–7c also leads to an accelerated collapse process. As seen from FIG. 7a, the gases emerging from the burner heads 14 and 15 are directed against the quartz glass tube 16, in order to prepare it correspondingly for the internal coating or the subsequent collapse process. As can be seen from the flow lines, and in part considerable deflection of the flow lines of the burner gases 17 takes place for the temperature profile determined along the irradiated tube section, which means sides ascending or descending with a small angle. In order to prevent these undesired properties, which show up particularly during the increase in burner capacity in an inadequate stability of the quartz glass tube 16, suction plates 18 and 19 are located before and after the burner heads 14 and 15, as can be seen from FIGS. 7b and 7c, with said suction plates limiting the marginal regions of the zone of the tube 16 irradiated by the burner and thus leading to steep local temperature gradients in this irradiated region.

FIGS. 6a–6b and 7a–7c show possible ways in which the width of the hot zone can be increased by suitable measures and can be approximated to the width of the soft zone. However, the invention is not limited to the burner arrangements shown as exemplifying embodiments. Other embodiments of heat sources are also suitable, provided that they are capable of producing the above-mentioned approximation.

What is claimed is:

1. A process for the production of a blank mold for glass fiber optical waveguides with a core and a single- or multiple-layer sheath, in which the core glass material is applied to the inner wall of a glass tube by chemical deposition from the vapor phase, the internally-coated glass tube is caused to collapse by temperature treatment, and this blank mold is finally drawn out to a glass fiber, said process comprising the steps of:

providing heating means adjacent the glass tube for carrying out a temperature treatment for collapse of the glass tube, the heating means providing a temperature profile in a section of the glass tube being treated that is determined by an upper region of maximum glass temperature and a lower region at glass softening temperature, in which the upper region of maximum glass temperature shows a largely uniform temperature level with a width along the section of the glass tube that is approximately equal to a width of the lower region at the glass softening temperature; and carrying out the temperature treatment for collapse of a length of the glass tube by providing relative movement between the heating means and the glass tube along the length of the glass tube.

2. A process according to claim 1, wherein the ratio of the width of the upper region of maximum glass temperature to the width of the lower region at glass softening temperature has a value of 1:4 to 1:1.

3. A process according to claim 1, wherein the temperature profile has a width which is restricted to the width of the lower region at the glass softening temperature.

4. A process according to claim 1, wherein the glass softening temperature has a value of approximately 1800° C.

5. A process according to claim 1, wherein the temperature treatment is carried out by means of gas burners producing a flame flow.

6. A process according to claim 5, wherein the temperature treatment includes the step of controlling the flame flow of the burners.

7. A process according to claim 6, wherein the controlling step includes modifying marginal regions of the flame flow.

8. A process according to claim 6, wherein the controlling step is carried out by a deflection of the flame flow from the surface of the glass tube.

9. A process according to claim 8, wherein the deflection of the flame flow from the surface of the glass tube is carried out by means of a supplementary gas stream.

10. A process according to claim 8, wherein the deflection of the flame flow from the surface of the glass tube is carried out by suction means to exhaust the flame flow in marginal regions thereof.

11. A process according to claim 1, wherein the ratio of the width of the upper region of maximum glass temperature to the width of the lower region at glass softening temperature has a value of 1:2 to 1:1.

* * * * *